United States Patent [19]

Bove et al.

[11] Patent Number: 5,456,007
[45] Date of Patent: Oct. 10, 1995

[54] ASSIST METHOD AND APPARATUS FOR FITTING CLOSE TOLERANCE VALVES INTO BORES

[75] Inventors: Nelson D. Bove, Cincinnati; Darryl E. Helton, Morrow, both of Ohio

[73] Assignee: Ford Motor Company, Dearborn, Mich.

[21] Appl. No.: 173,023

[22] Filed: Dec. 27, 1993

[51] Int. Cl.[6] ............................................. B23P 15/00
[52] U.S. Cl. .................. 29/890.124; 29/447; 137/625.69
[58] Field of Search ........................... 29/464, 447–434, 29/743, 777, 890.124, DIG. 44; 137/315, 625.69

[56] References Cited

U.S. PATENT DOCUMENTS

| | | |
|---|---|---|
| 3,667,103 | 6/1972 | Petre ............................................ 29/743 |
| 3,729,796 | 5/1973 | Sell et al. .................................... 29/743 |
| 3,856,043 | 12/1974 | Feild et al. . |
| 4,220,178 | 9/1980 | Jackson . |
| 4,446,883 | 5/1984 | Paul, Jr. . |
| 4,693,001 | 9/1987 | Van Ornum . |
| 4,745,681 | 5/1988 | Hollis, Jr. et al. ........................ 29/743 |
| 4,833,765 | 5/1989 | Bohland . |
| 4,914,809 | 4/1990 | Eukai et al. ............................... 29/740 |
| 5,292,054 | 3/1994 | Leeb et al. ................................. 29/743 |

Primary Examiner—Irene Cuda
Attorney, Agent, or Firm—Donald A. Wilkinson; Roger L. May

[57] ABSTRACT

A method for assembling a part, such as a spool valve into a bore of a body, such as a transmission valve body. A vacuum means creates suction within the bore in the direction of insertion of the spool valve. A gripper tool attached to a robotic arm supports the spool valve with a light vacuum pressure and maneuvers the spool valve, aligning it sufficiently close to allow the suction in the bore and gravity to pull the spool valve free of the suction of the gripper tool and into the bore.

7 Claims, 2 Drawing Sheets

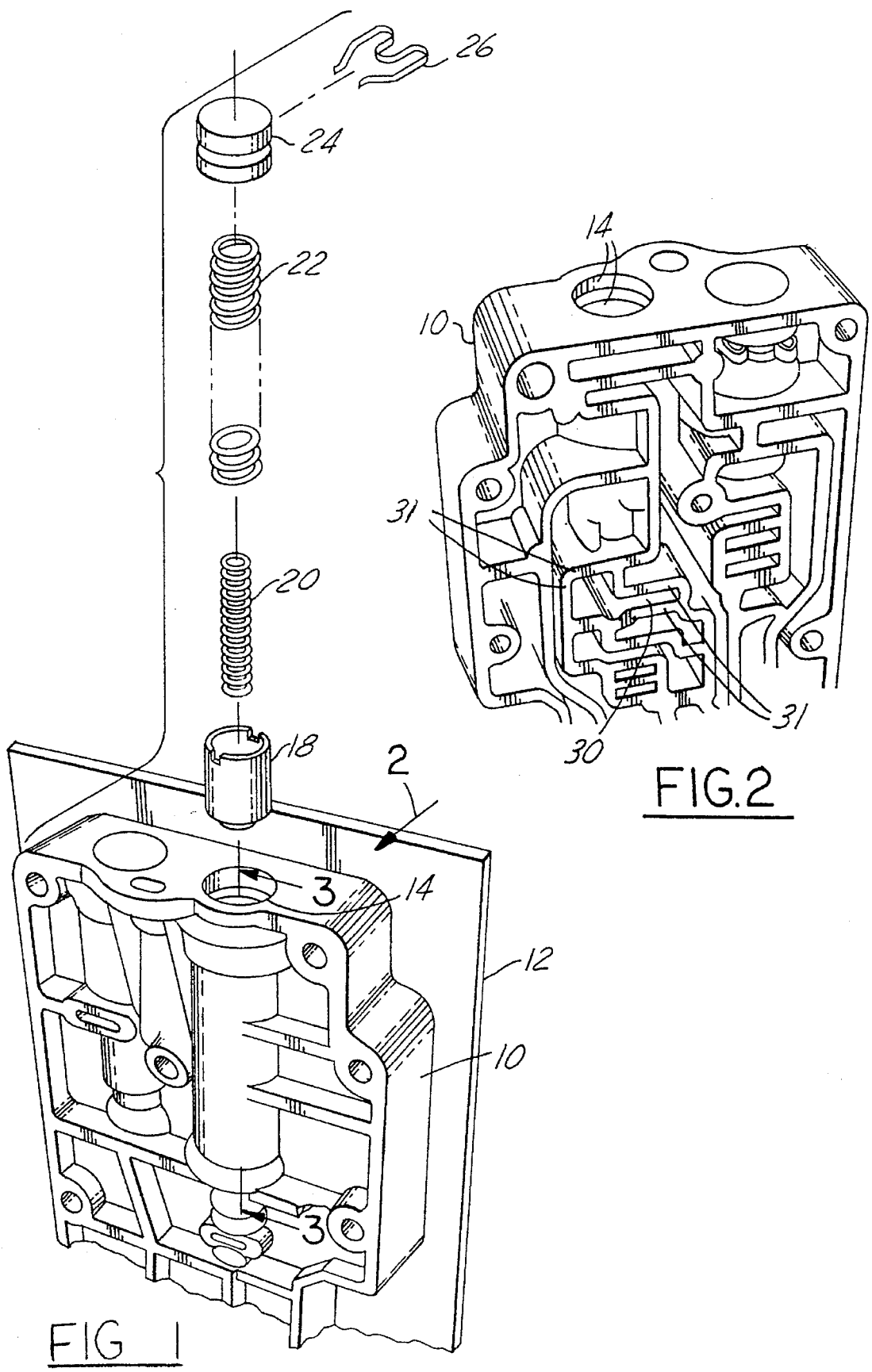

ASSIST METHOD AND APPARATUS FOR FITTING CLOSE TOLERANCE VALVES INTO BORES

FIELD OF THE INVENTION

The present invention relates to a method and apparatus for assembling vehicle parts using a mechanical means and more particularly for assembling a close tolerance automotive part into a bore of another part using a mechanical means.

BACKGROUND OF THE INVENTION

Currently, the assembly of close fitting parts into bores of another part, in particular spool valves into valve bores in transmission valve bodies, is done mainly by hand. Manufacturers have tried to use mechanical insertion devices to avoid the expense of hand assembly. In general, these devices attempt to precisely locate the bore to determine exact alignment just prior to each attempt to place and push a spool valve into the bore. With these devices, any jams that occur while pushing are rectified through force feedback information and through the use of a continual arbitrary search for the correct position and orientation. These devices require exacting precision in locating the bore each time and are still prone to jamming.

Further, a need exists to evacuate foreign matter located within the bore prior to inserting the spool valve into the bore. Neither the hand assembly method nor the prior automated assembly devices serve this purpose while assembling the parts.

The need, then, arises to provide a device that will eliminate the need for hand assembly of close fitting valve spools into valve bores, yet will quickly and reliably locate and insert the spool valves into the bores while avoiding problems with jamming and the need for the exacting precision required with devices that locate and push the spool valves into the bores. A further benefit is gained from a device that can also assist in evacuating foreign matter from within the valve bore prior to insertion of the spool valve.

SUMMARY OF THE INVENTION

In its embodiments the present invention contemplates a method of assembling a close fitting part into a bore of a body. The method includes aligning the part immediately outside of the bore oriented substantially concentric with the bore, beginning vacuum suction in the bore in the direction of insertion of the part, and receiving the part in the bore.

The invention further contemplates a mechanism for inserting a part into a bore of a body. The mechanism includes a gripper for manipulating the part and vacuum means for creating a vacuum within the bore in the direction of part insertion. The mechanism further includes a motion means for moving the spool valve and substantially aligning it immediately outside of and substantially concentric with the bore, and a means for allowing the part to break free from the gripper when the part is aligned with the bore.

Accordingly, it is an object of the present invention to provide a device that can assembly a part, in particular a spool valve, into a bore of a body, in particular a transmission valve body, using a vacuum suction within the bore to assist in aligning and drawing the part into it.

It is an advantage of the present invention that a device can assemble a close fitting part into a bore without the need for hand assembly while avoiding jamming caused by pushing the part into the bore.

An additional advantage is the evacuation of foreign matter from the bore during assembly, reducing the risk that foreign matter will interfere with the performance of the part.

BRIEF DESCRIPTION OF THE DRAWINGS

FIG. 1 is a partially exploded perspective view of a transmission valve body and a vacuum plate in accordance with the present invention;

FIG. 2 is a partial perspective view taken in the direction of Arrow 2 in FIG. 1 with the vacuum plate and valve assembly not shown;

DETAILED DESCRIPTION OF THE PREFERRED EMBODIMENTS

Figure 3:
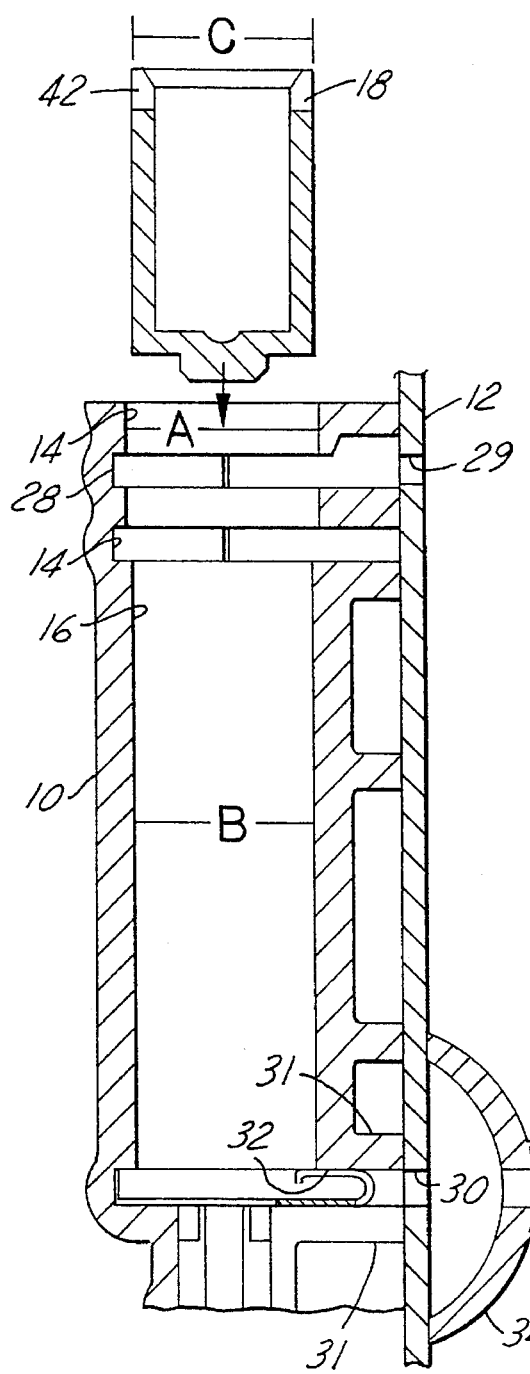
FIG. 3 is a cross-sectional view, on an enlarged scale, taken along line 3—3 in FIG. 1.

FIGS. 1–3 show a transmission valve body 10 mounted to a vacuum plate 12. The transmission valve body 10 includes primary valve bores 14 and a secondary valve bore 16. A spool valve 18 assembles through the primary valve bores 14 and into the secondary valve bore 16. A small spring 20, large spring 22 and a cap 24 then assemble into the bores with a spring clip 26 insertable into a slot 28 in the valve body 10, through an opening 29 in the vacuum plate 12, to secure the cap 24 in place.

Vacuum plate 12 is affixed to valve body 10 in any conventional manner to assure minimal air leakage between plate 12 and flanges 31 in valve body 10. An opening 30 in vacuum plate 12 is aligned with an opening 32 in valve body 10 that extends into secondary bore 16. Affixed to vacuum plate 12 about opening 30 is a vacuum manifold 34, which is further attached to a vacuum suction mechanism 36. Vacuum suction mechanism 36 can be a conventional motor driven air pump similar to pumps used on vacuum cleaners or the like.

The diameters A of primary valve bores 14 are slightly greater than the diameter B of secondary valve bore 16. Diameter C of spool valve 18 is in the range of 0.0007–0.0011 inch diameter smaller than the secondary bore diameter B, with an average of approximately 0.0009 inch difference. This means that the gap between the outer surface of spool valve 18 and the inner surface of secondary bore 16, if they are aligned perfectly concentrically, is 0.00045 inch. This tolerance makes insertion of spool valve 18 into secondary bore 16 without jamming difficult.

Figure 4:
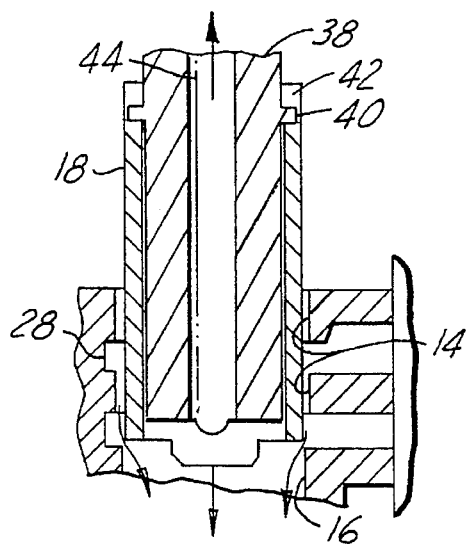
FIG. 4 is a cross-sectional view, on an enlarged scale, showing a valve bore, spool valve and a robotic gripping tool in accordance with the present invention.

FIG. 4 shows spool valve 18 supported by a pilot gripper tool 38. Pilot gripper 38 is cylindrical, has a slightly smaller diameter than the inner diameter of spool valve 18 and includes a pair of pins 40 for aligning with a pair of corresponding slots 42. Through the center of pilot gripper 38 is a vacuum bore 44. A conventional robot with an arm (not shown) is connected to pilot gripper 38 for manipulating the location of pilot gripper 38 and providing a vacuum pressure in vacuum bore 44 when needed.

In operation, a robot arm (not shown) maneuvers pilot gripper 38 in position within a spool valve 18 that is ready for assembly and then begins pulling a light vacuum through vacuum bore 44. This light vacuum causes pilot gripper 38 to pick up spool valve 18. The arm then prepositions spool valve 18 as precisely and square as possible and lowers spool valve 18 through primary valve bores 14 to within approximately ⅛ inch of secondary valve bore 16. A typical robot can place the spool valve to within approximately 0.001 inch of the exact location in the lateral direction.

A fluid, such as air, is drawn through secondary bore 16 in the direction of spool valve insertion by vacuum suction mechanism 36. This causes a vacuum, i.e., a negative pressure, within secondary bore 16. The volume of air drawn through secondary bore 16 is sufficient to create a significantly greater vacuum in secondary bore 16 than is in vacuum bore 44. Since pilot gripper 38 on the robot arm holds it only by the light vacuum, it is loose enough to allow spool valve 18 to be aligned and then pulled free from pilot gripper 38 by the larger vacuum in secondary bore 16 and by a gravity force. The spool valve, then, is immediately swallowed into secondary bore 16 of transmission valve body 10 once it is aligned.

Ideally, for ease of assembly, it is desired to have a uniform insertion load across the spool valve face in which the load is always in an axial direction of a bore centerline. This eliminates the problem with spool valve 18 coming in at a jam angle that can occur when trying to push a valve in with mechanical tooling. With a normal robot, any misalignment of the valve when trying to align it immediately prior to insertion will not allow it to push the valve into the bore because of this jamming.

Figure 5:
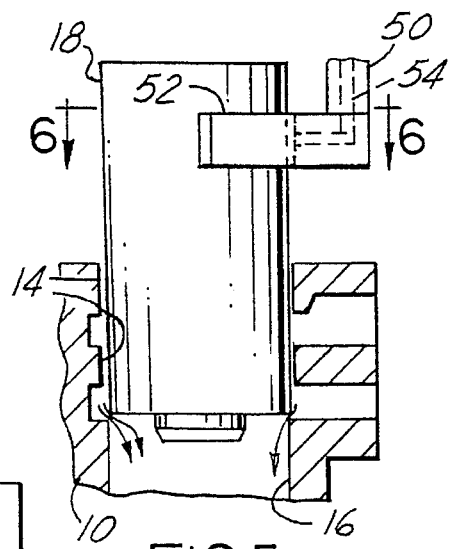
FIG. 5 is a cross-sectional view, on an enlarged scale, of a bore, spool valve and a second embodiment of a robotic gripping tool in accordance with the present invention.

However, by providing a suction in secondary bore 16, any minor misalignment immediately prior to spool valve insertion will cause leakage of air around that side of the valve that provides space for the air to flow through. It is believed that the Bernoulli principle applies here. As shown in FIG. 4, when spool valve 18 is essentially centered and concentric with secondary valve bore 16, the air flow around spool valve 18 into secondary valve bore 16 is essentially the same about its circumference, thus the pressure about spool valve 18 is constant. On the other hand, when spool valve 18 is not centered, as shown in FIG. 5, the air flow will be greater on a first side and essentially non-existent opposite from this first side. The air velocity, then, will be greater on this first side, resulting in a lower pressure on the first side. This lower pressure will cause the valve to move slightly in the direction of this lower pressure thus assisting in centering spool valve 18.

The section of air through secondary bore 16 also provides the added benefit of helping to evacuate secondary bore 16 of any foreign matter that may still be in there due to the valve body fabrication process.

Optionally, just prior to insertion of spool valve 18 into transmission valve body 10, the robot arm can twist pilot gripper 38 back-and-forth about a central longitudinal axis to aid in insertion of spool valve 18.

After insertion of spool valve 18, small spring 20, large spring 22, and cap 24 can be assembled into the bores using conventional mechanical means. Spring clip 26 can then be slid into slot 28 to secure the assembly in place, again using conventional mechanical means if so desired.

Figure 6:
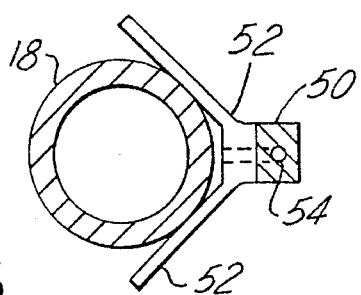
FIG. 6 is a cross-sectional view taken along line 6—6 in FIG. 5.

A second embodiment is shown in FIGS. 5 and 6. In this embodiment, a V-block gripper tool 50 is used to maneuver spool valve 18 instead of a pilot tool gripper. V-block gripper tool 50 includes a pair of V-grips 52, which align spool valve 18 relative to V-block gripper tool 50, and a vacuum bore 54 within V-block gripper tool 50 that includes an opening at the intersection 56 of the two V-grips 52.

In operation, the robot arm (not shown) is moved into position about a spool valve 18 and a light suction is begun in vacuum bore 54. This light suction is sufficient to hold valve spool 18 on V-block gripper tool 50. Then, valve spool 18 is moved over to transmission valve body 10 and dropped down through primary valve bores 14 and stopped approximately ⅛ inch before secondary valve bore 16. While valve body 10 is being moved into position, vacuum suction mechanism 36 is started and creates a vacuum in secondary valve bore 16. The low vacuum in shear holding valve spool 18 on V-block 50 will allow valve spool 18 to slip loose somewhat from V-grips 52, until it aligns with secondary bore 16 and then is completely sheared from V-grips 52 and received in secondary valve bore 16. Again, the Bernoulli Effect is believed to assist in aligning spool valve 18 with secondary valve bore 16.

To assist with the alignment, spool valve 18 can additionally be moved by the robot arm in a rotary orbital spiral motion about a central longitudinal axis of spool valve 18. Preferably, it would spiral in increasing circles of ¹⁄₁₀₀₀ inch increase in diameter per cycle around valve bore 16 using the light suction to hold it to gripper 50 until valve 18 is aligned with secondary bore 16 sufficiently enough to allow it to be received into bore 16. Further, the twisting motion discussed relative to the first embodiment could also be used in this embodiment if so desired.

While certain embodiments of the present invention have been described in detail, those familiar with the art to which this invention relates will recognize various alternative designs and embodiments for practicing the invention as defined by the following claims.

We claim:

1. A method of assembling a spool valve into a valve bore of an vehicle transmission body comprising:

aligning the spool valve immediately outside of the valve bore oriented substantially concentric with the valve bore;

beginning vacuum suction in the valve bore in the direction of insertion of the spool valve; and receiving the spool valve into the valve bore.

2. A method according to claim 1 further comprising the steps of supporting the spool valve by a suction mechanism and pulling the spool valve free of the suction mechanism prior to receiving the spool valve into the bore.

3. A method according to claim 2 wherein the step of supporting the spool valve comprises sucking up the spool valve on a pilot gripper tool and maneuvering the spool valve with the pilot gripper tool.

4. A method according to claim 2 wherein the step of supporting the spool valve comprises picking up the spool valve with a V-block gripper tool and maneuvering the spool valve with the V-block gripper tool.

5. A method according to claim 1 further comprising the step of twisting the spool valve back-and-forth until the spool valve is received into the valve bore.

6. A method according to claim 1 further comprising the step of moving the spool valve in a spiral motion about a central longitudinal axis of the spool valve of progressively increasing diameter until the spool valve is received into the valve bore.

7. A method according to claim 1 further comprising evacuating foreign matter from the valve bore prior to receiving the spool valve into the bore.

* * * * *